United States Patent
Bentzinger (10) Patent No.: US 9,288,943 B2
(45) Date of Patent: Mar. 22, 2016

(54) RAKE WHEEL WITH PLASTIC SUPPORT BAND FOR TINES

(71) Applicant: FORAGE INNOVATIONS B.V., Maassluis (NL)

(72) Inventor: Rustin V. Bentzinger, Pella, IA (US)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 13/723,330

(22) Filed: Dec. 21, 2012

(65) Prior Publication Data

US 2013/0104514 A1    May 2, 2013

Related U.S. Application Data (63) Continuation of application No. PCT/NL2011/000052, filed on Jul. 5, 2011.

(60) Provisional application No. 61/361,587, filed on Jul. 6, 2010.

(51) Int. Cl.
*A01D 78/00* (2006.01)
*A01D 78/14* (2006.01)
*A01D 80/02* (2006.01)

(52) U.S. Cl.
CPC ............... *A01D 78/14* (2013.01); *A01D 80/02* (2013.01)

(58) Field of Classification Search
CPC ...................................... A01D 80/02
USPC ............................ 56/375–379, 384, 399, 400
See application file for complete search history.

(56) References Cited

U.S. PATENT DOCUMENTS

| | | | |
|---|---|---|---|
| 2,712,723 A * | 7/1955 | Ryan | 56/400 |
| 2,811,008 A * | 10/1957 | Plant | 56/367 |
| 3,038,292 A * | 6/1962 | Van Der Lely et al. | 56/377 |
| 3,057,145 A | 10/1962 | Van Der Lely | |
| 3,401,753 A * | 9/1968 | Bezzerides et al. | 172/543 |
| 3,447,295 A | 6/1969 | Van Der Lely | |
| 3,834,140 A | 9/1974 | Delfino | |
| 4,015,411 A * | 4/1977 | van der Lely et al. | 56/366 |
| 4,324,093 A | 4/1982 | Van Der Lely et al. | |
| 4,598,271 A | 7/1986 | Wagli | |
| 5,039,528 A | 8/1991 | Olney | |

(Continued)

FOREIGN PATENT DOCUMENTS

| | | |
|---|---|---|
| FR | 1282197 A | 1/1962 |
| GB | 859340 | 1/1961 |
| GB | 1114279 | 5/1968 |

OTHER PUBLICATIONS

Wikipedia-UHMW PE, Wikipedia, "Ultra high molecular weight polyethylene", May 4, 2008, p. 1.*

(Continued)

*Primary Examiner* — Thomas B Will
*Assistant Examiner* — Mai Nguyen
(74) *Attorney, Agent, or Firm* — Armstrong Teasdale LLP (57) ABSTRACT

A rake wheel has a hub with tines extending outwardly from the hub. The tines extend through evenly spaced openings in a support band. At least the inner periphery of the openings through the support band are made of a material softer than the material of the tines to minimize the wear of the tines where the tines touch the inner periphery of the openings as the tines move with respect to the inner periphery of the openings during the use of the rake wheel.

15 Claims, 8 Drawing Sheets

(56) References Cited

U.S. PATENT DOCUMENTS

| | | | |
|---|---|---|---|
| 5,199,252 A | 4/1993 | Peeters | |
| 5,343,643 A | 9/1994 | Cochrane | |
| 5,699,045 A | 12/1997 | Frederick et al. | |
| 6,220,008 B1 | 4/2001 | Rowse et al. | |
| 6,543,212 B2 * | 4/2003 | Tonutti | 56/375 |
| 6,715,275 B1 | 4/2004 | Kuehn | |
| 6,978,592 B1 * | 12/2005 | Miller | 56/400 |
| 2004/0063265 A1 | 4/2004 | Noble | |

OTHER PUBLICATIONS

Wikipedia-NYLON, Wikipedia, "Nylon", Dec. 3, 2003, p. 1.*
International Search Report, Application No. PCT/NL2011/000052, dated Jul. 23, 2013, pp. 5.

* cited by examiner

RAKE WHEEL WITH PLASTIC SUPPORT BAND FOR TINES

CROSS REFERENCE TO RELATED APPLICATIONS

This application is a continuation of PCT application number PCT/PCT/NL2011/000052 filed on 5 Jul. 2011, which claims priority from U.S. Provisional Patent Application Ser. No. 61/361,587 filed 6 Jul. 2010. Both applications are hereby incorporated by reference in their entireties.

BACKGROUND OF THE INVENTION

1. Field of the Invention

The present invention relates generally to rakes for raking hay or crop residues and more particularly to rake wheels and the construction thereof.

2. Description of the Related Art

Wheel rakes have been found to be an effective farm implement for raking hay, which is generally an agricultural crop grown on a relatively even surface, evenly distributed, and cut for harvest at a consistent height, or other materials like crop residues. Crop residue, like corn stover, the residue from agricultural crops left by a previous operation, typically the harvest of grain, is being harvested more now than in the past for a variety of reasons including for use as a fuel. In the specific example of corn stover, the plants are gown in distinct rows, which results in an undulating surface, which makes raking more difficult. Even in these tougher conditions the wheel rakes are typically used to collect the material from a wide area, into a smaller windrow so that the subsequent baling operation will be efficient, although the rakes have not been designed for this more difficult condition.

Wheel rakes are typically configured as a V-rake, which can include a main frame, with a front end adapted to be hitched to a tractor. Rake arms typically supported at the back end of the main frame, are controlled such that they may be positioned adjacent the main frame in a closed or traveling position or extended in the form of a V in the opened or raking position. The V-rake is supported by a number of rolling wheels mounted on the main frame. Some configurations include additional wheels mounted on the rake arms. Each rake arm includes a number of suspension mechanisms, each supporting a single rake wheel, with four to ten or more rake wheels supported by each rake arm. The suspension mechanisms allow the rake wheels to float, to change height to follow the terrain, while maintaining a consistent weight of the rake wheel on the ground. The weight of the rake wheel on the ground is important for proper operation, the rake wheels are not powered, they rotate and move material as a result of the movement of the entire rake.

Examples of rakes of the aforementioned type are described in U.S. Pat. No. 4,324,093 issued Apr. 13, 1962 to van der Lely et al; U.S. Pat. No. 5,039,528 issued Nov. 19, 1971; U.S. Pat. No. 5,199,252 issued on Apr. 6, 1993 to Peeters; U.S. Pat. No. 5,343,643 issued Feb. 27, 1996 to Tonitti; U.S. Pat. No. 5,498,271 issued on Feb. 4, 1997 to Peeters; U.S. Pat. No. 5,699,045 issued on May 4, 1999 to Rowse et al; U.S. Pat. No. 6,220,008 issued Apr. 24 to Rowse et al and US Patent Publication 2004/0063265 published May 6, 2004 to Tonutti. All of the patents and published patent applications mentioned in this document are incorporated herein by reference in their entirety.

In addition to the description of the basic rakes, these references also describe a variety of rake wheels. Additional examples of rake wheels are described in U.S. Pat. No. 3,057,145 issued Oct. 9, 1962 to van der Lely and in U.S. Pat. No. 3,447,295 issued Jun. 3, 1969 to van der Lely, which is incorporated by reference in its entirety.

U.S. Pat. No. 3,447,295, which is incorporated by reference in its entirety, to van der Lely shows rake wheel tines passing through a rim, this patent uses the term "felly" for ref 7, that has elements made of organic elastic material to reduce stress concentrations, and reduce the risk of breakage. U.S. Pat. No. 3,447,295, in some embodiments, "vulcanizes" the metal tine to the elastic portion of the circular band and in other embodiments clamps the elastic tightly against the metal tine.

U.S. Pat. No. 3,447,295 in column 4, lines 33-39 states: "In all of the embodiments which have been described, the spokes are integral with the tines and are resiliently supported through a relatively short part of their length by organic elastic material. The organic elastic material tends to oppose resilient deformation of the spokes during use of the rake wheel so that the resilience of the tines is not excessive." Lines 46-51 of Column 4 in the '295 patent says: "There is a tendency to substantial wear and eventual breakage at the points at which tines or their spokes extend through holes in fellys but the constructions which have been described greatly reduce or entirely avoid wear at the points just mentioned." In summary, U.S. Pat. No. 3,447,295 recognizes "a tendency to substantial wear and eventual breakage at the points at which tines or their spokes extend through holes in fellys" and solves the problem by avoiding any friction between the tine and the felly, i.e. the '245 patent solves the friction problem by attaching plastic to the tine by vulcanization or clamping.

U.S. Pat. No. 3,057,145, which is incorporated by reference in its entirety, shows a rake wheel that includes independent bearing elements or supports 16 attached to a rim 18 and an alternate embodiment having bearing elements or supports 34 attached to a rim 39.

Although these aforementioned prior art rakes have been in use for some time, it has been found that they do not always satisfy the needs of farmers and ranchers in part due to an inherent weakness in the common construction of the rake wheels. These deficiencies are exacerbated in tougher conditions such as when raking crop residues.

Prior art rake wheel assemblies are constructed in a variety of ways to support a number of tines. In some cases the rake wheels utilize relatively short tines and the assembly is comprised of a hub with spoke structures that support an outer rim or band, with the tines mounted to and extending beyond outer rim. An example of this configuration can be found in U.S. Pat. No. 3,834,140 issued Sep. 10, 1974 to Delfino which is incorporated by reference in its entirety.

In a more common construction a rake wheel is comprised of relatively long tines attached to the hub. Two examples of wheels constructed in this manner are described in U.S. Pat. No. 4,324,093 issued Apr. 13, 1982 to van der Lely and U.S. Pat. No. 6,715,275 issued Apr. 6, 2004 to Kuehn, which are incorporated by reference in their entirety. The primary support member for the rake wheel assembly of this construction is the hub. The hub includes bearings that allow the assembly to rotate freely about a spindle. There are a variety of configurations used for the rest of the assembly, but in a typical construction the hub includes an outer disk assembly that clamps a first end of each tine. In this manner the first end of each tine is held securely such that it is not able to rotate or slide relative to the hub which thus provides the primary control for the orientation of the tines. However, the hub alone does not provide adequate support for the tines so the rake wheel assembly further includes an outer support band, felly, or rim typically made from a low carbon steel having a series of holes equally spaced around its circumference for receiving rake teeth or tines. The second, outer end of each tine slides through one of the tine support holes in the support band, which provides a relatively loose support for the tines. The support band is traditionally constructed from a bar constructed of low carbon steel with a rectangular cross section of approximately 0.1875 to 0.25 inches thick and 1.0 to 1.25 inches wide. The support band is rolled into its round shape after the tine holes are drilled in the bar. In its rolled configuration the outer support band is adequately rigid to provide support for the tines. This type of outer support band has been accepted as a component of the rake wheel assembly, providing additional support for the individual tines, by loosely connecting all the tines together, while at the same time allowing each individual tine to slide and rotate, in its tine support hole, allowing the loads, both bending and twisting, on the tines to be distributed along the entire length of the tine. This assembly has proven to be cost effective, is commercially successful as it meets the majority of the needs for farmers and ranchers, however there are some inherent problems associated with this assembly, and a need for an improved assembly.

Although the amount of relative movement between the tine and the support band is small, it is adequate, after a high number of cycles, to cause wear of both the tine and the outer support band. The operation of a wheel rake inherently subjects the tines to a high number of cycles. When the rake wheels engage the ground, which is required for operation as a result of the fact that they are ground driven, the end of each individual tine drags along the ground, which induces a force at the end of the tines. The tines are supported by the band and the hub so that the support band presses against the tines with an equal and opposite force. The tines include a bent portion so that the end of the tine, the point contacting the ground, is offset from the main portion of the tine that is supported by the support band. This offset results in generation of a torque load on the tine, resulting in a twisting action of the tine. Thus in addition to the force between the hoop and the tine, there is also relative motion caused by twisting of the tine. This combination of force and relative movement causes the tines and hoop holes to wear. After time, the tines will have a notch, created from the friction between the tines and the hoop, which causes a thin section that causes a stress riser which causes the tines to break at that point. This failure is a significant concern for this type wheel, and there is a need for an improved wheel.

There are economic advantages to making both the tines and the support bands from steel. The tines are typically made from a high carbon steel rod, while the support bands are made from low carbon steel. The practice of using similar materials exacerbates the wear. The wear of the tine is focused in a very specific area, and has been observed to cause premature failure of the tines, which is known shortcoming of rake wheels.

In addition to the wear, the relative movement, combined with the steel-on-steel contact of the tine to the support band, causes the rake wheels to create a noticeable amount of noise.

Accordingly, there is a need for an improved rake wheel, to provide improved reliability and longer life of the rake tines, and to provide quieter operation.

BRIEF SUMMARY OF THE INVENTION

In accordance with an aspect of the invention, a rake wheel of the present invention comprises a support band with an adaptor constructed from a material other than steel, so that the tine supporting surface at the support band is a dissimilar material than the tine to minimize the wear of the tine. According to various embodiments of the present invention, the support band is a contact ring.

In accordance with a further aspect of the invention the rake wheel of the present invention comprises a support band made from a material other than steel, so that the rigidity of the support band is reduced, providing additional cushioning of shock loads applied to the tine, which results in reduced wear and reduced noise of the assembly.

In accordance with a further aspect of the invention the rake wheel of the present invention comprises a support band, or inserts to the support band, made from a material other than steel to reduce wear on the tines.

Aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
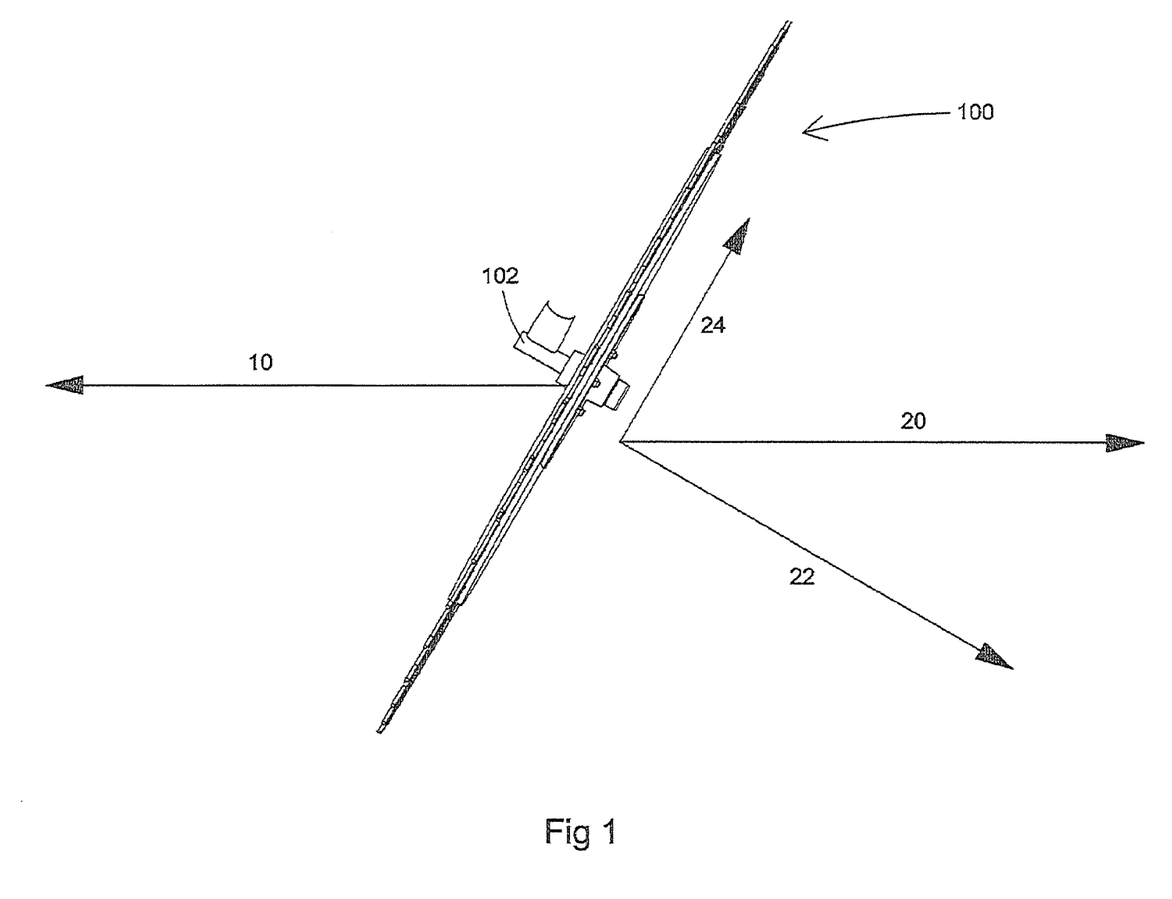
FIG. 1 is a top view of a rake wheel constructed in accordance with the present invention.

The following is a description of certain embodiments of the invention, given by way of example only and with reference to the drawings. Referring now to the drawings wherein like reference numbers designate identical or corresponding parts throughout the several views, FIG. 1 illustrates a top view of a wheel 100 mounted to spindle 102 with a vector 10 indicating a general direction of travel, and a load vector 20 showing the force that will be exerted on an individual tine. That force can be broken down into a first component 22 perpendicular to the plane of the wheel, parallel to the axis of rotation of the wheel, and a second component 24 perpendicular to the axis of rotation. The second component 24 propels the wheel, providing the force to rotate the wheel, while the first component 22 acts on the ground and/or the material that is being raked. The first component 22 is also the main force that causes the tine to deflect.

Figure 2:
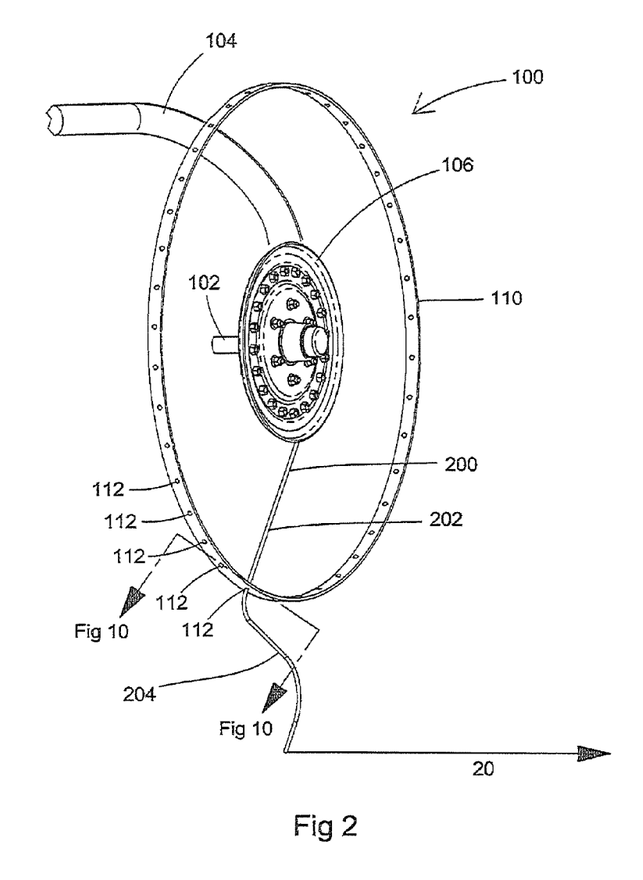
FIG. 2 is a perspective view of a rake wheel for attachment to a rake showing only one of a plurality of tines that would extend through each of the holes shown in a circular support band.

FIG. 2 illustrates one embodiment of a rake wheel supported by a suspension arm 104. Spindle 102 is attached to the suspension arm, and supports the hub 106. Only one tine 200 is illustrated in this FIG. 2 extending from the hub 106, through a tine support aperture 112 in support band 110. A complete wheel assembly will have a tine passing through each of the tine support apertures. The illustrated tine 200 includes a first relatively straight center section 202, a second relatively straight section 204 that is generally tangent to a band 110. This second straight section 204 acts like a lever arm. During operation when the tines contact the ground, the load 20 applied to the tine will results in a twisting load being applied to the first straight section 202. This twist results in relative movement between the band 110 and the tine 200.

Figure 3:
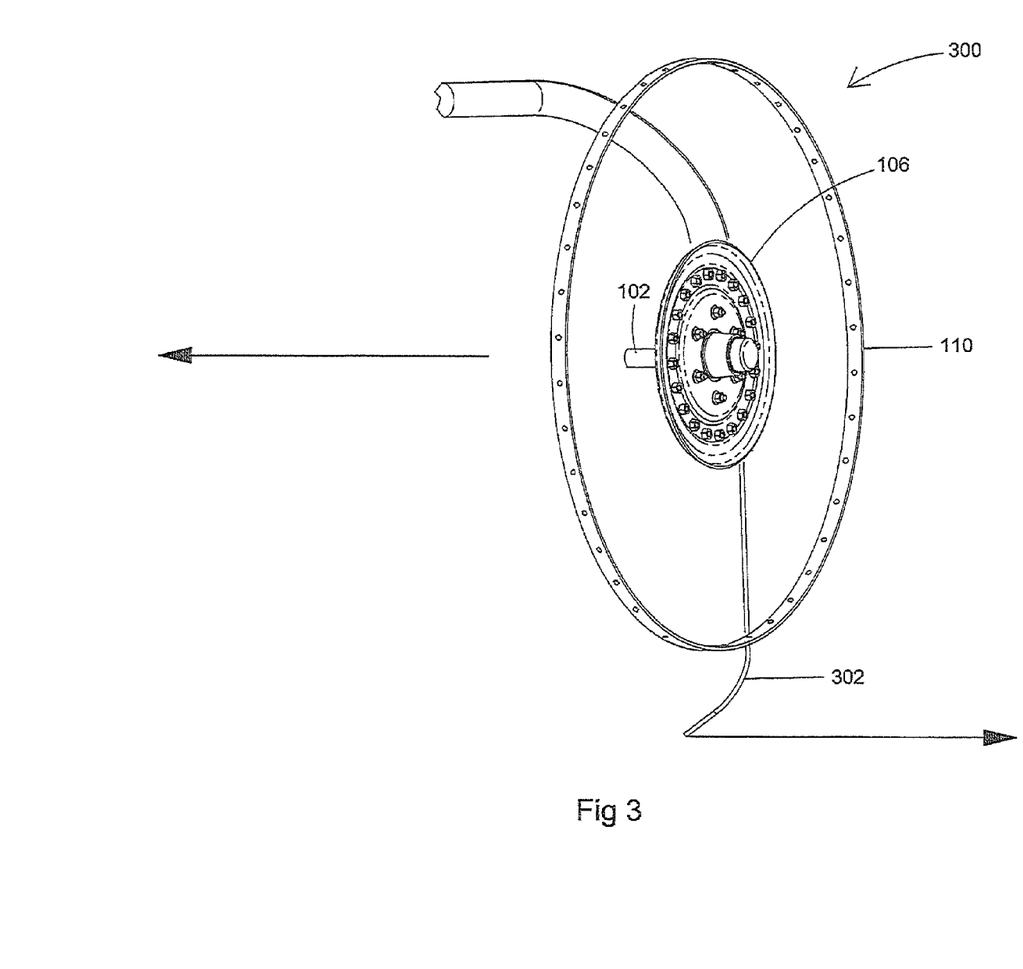
FIG. 3 is a perspective view of a second embodiment of a rake wheel for attachment to a rake showing only one of a plurality of tines that would extend through each of the holes shown in a circular support band.

FIG. 3 illustrates an alternative embodiment of a wheel 300 with the same spindle 102, hub 106, and support band 110 but a slightly different tine 302. This tine shape has advantages as described in U.S. Pat. No. 6,715,275, but the advantages of the present invention will provide similar advantages as those noted for the first embodiment.

Figure 4:
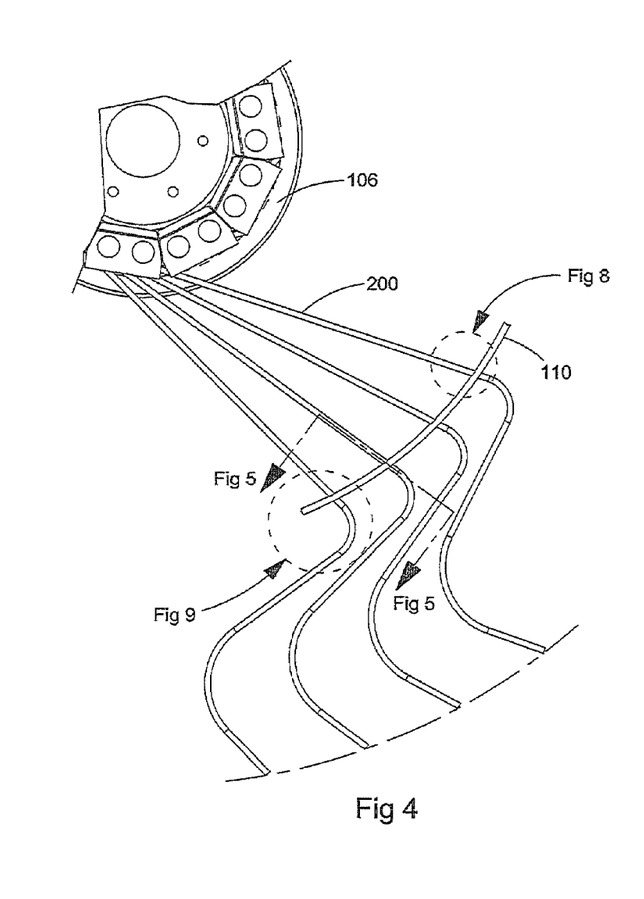
FIG. 4 is an enlarged side elevational view of the embodiment of FIGS. 1 and 2, showing only a segment of the rake wheel with only four of several tines that would be evenly spaced around the periphery of the circular support band.
Figure 5:
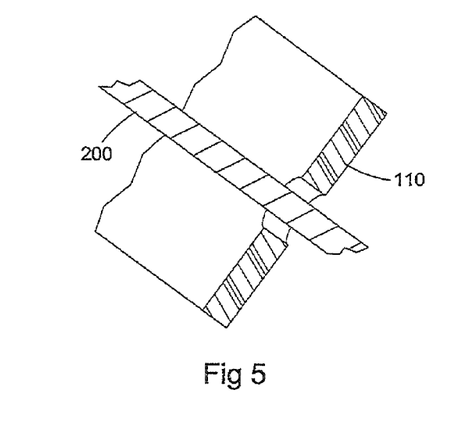
FIG. 5 is an enlarged cross sectional view taken along lines 5-5 of FIG. 4 showing a tine extending through one of the openings in the circular support band.
Figure 8:
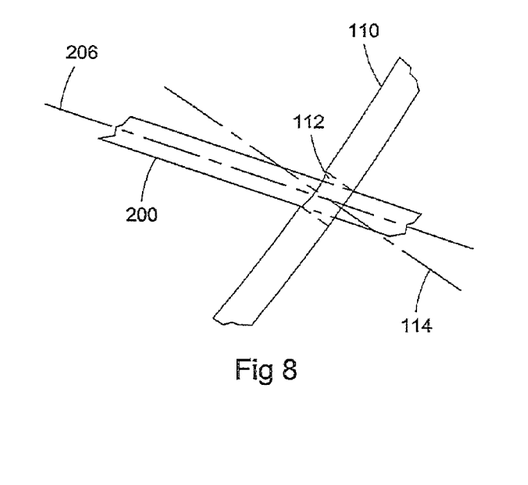
FIG. 8 is an enlarged side view showing the structure in the dashed line circle 8 of FIG. 4 showing a tine extending through one of the openings in the circular support band.

FIGS. 4, 5 and 8 illustrate more specifically how the individual tines 200 pass through the apertures 112 of the support band 110. FIG. 8 illustrates that the axis 114 of aperture 112 is not parallel to the axis 206 of the tine 200. This characteristic results from the typical manufacturing methods, which results in the aperture 112 in the support band having a sharp edge in contact with the tine 200. During use the tine 200 is free to move relative to the support band, in order to allow the loads to be evenly distributed along the entire length of the tine, rather than focusing the loads on a smaller portion of the tine.

Figures 6, 7:
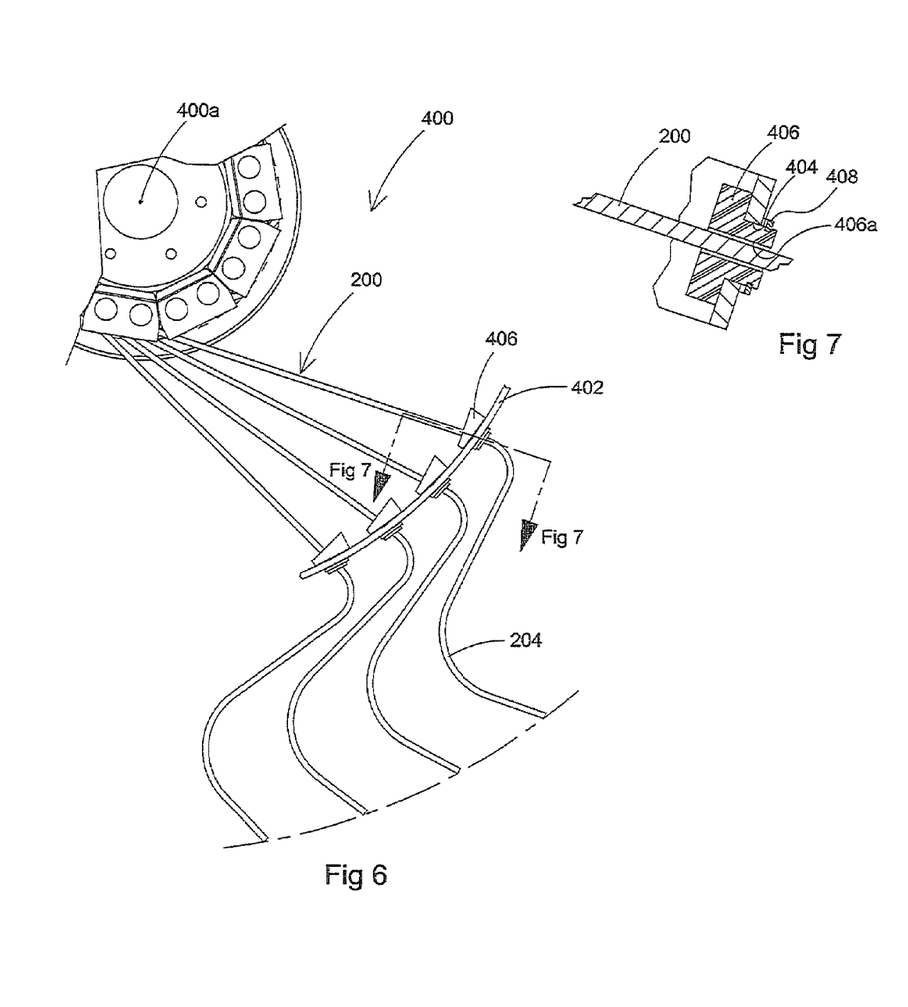
FIG. 6 is an enlarged side elevational view of another embodiment of showing only a segment of the rake wheel with only four of several tines that would be evenly spaced around the periphery of the circular support band, the main difference between the FIG. 4 embodiment and this FIG. 6 embodiment being that the circular support band is preferably made of steel and inserts in enlarged holes in the support band have plastic inserts in them to prevent wear of the tines that extend through central openings in the inserts.
FIG. 7 is an enlarged cross sectional view taken along lines 7-7 of FIG. 6 showing a tine extending through one of the openings in one of the plastic inserts extending through the circular support band.

FIGS. 6 and 7 illustrate an alternate embodiment of the present invention. In this embodiment the wheel 400 is comprised of tines 200 similar to those used in the first embodiment. The rake wheel 400 rotates around a hub 400h and axis of rotation 400a. This embodiment incorporates a support band 402 manufactured from steel, as is typical of prior art rake wheels. However, this embodiment of the present invention incorporates larger apertures 404 in the support band, with inserts 406 that are manufactured from a material other than steel, such as UHMW or NYLON. Inserts 406 are inserted from the inside of the circular ring 402 and then are held in place by a snap ring 408 in an unnumbered groove in the radially outward end of insert 406 as can best be seen in FIG. 7. The tine 200, having an outer end 204, extends through an opening 406a in insert 406

Figure 9A:
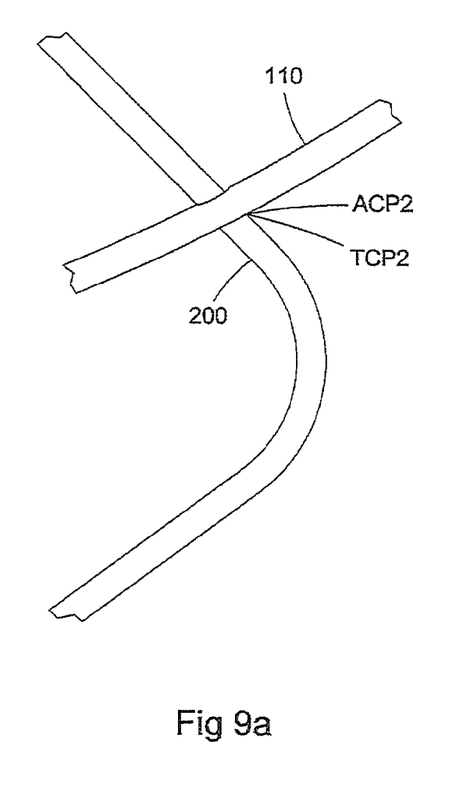
FIG. 9a is an enlarged side view showing the structure in the dashed line circle 9 of FIG. 4 showing another tine extending through another one of the openings in the circular support band when the rake wheel is not in use to show that the point TCP2 is adjacent or touching point ACP2 on the support band.
Figure 9B:
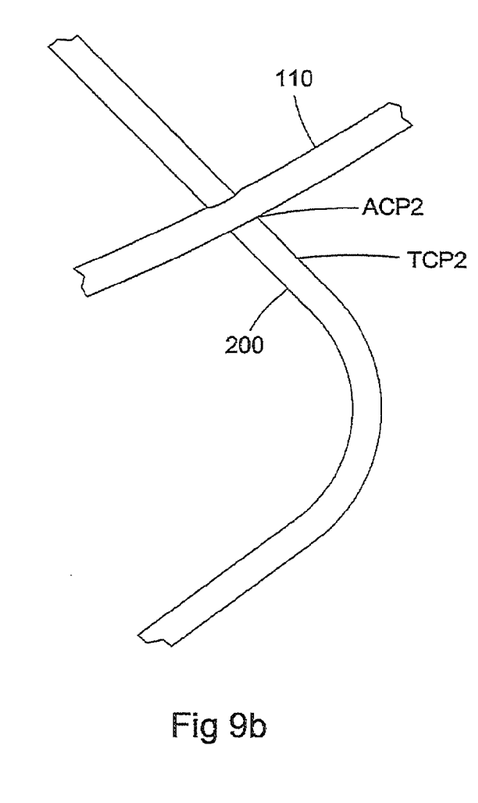
FIG. 9b is an enlarged side view showing the structure in the dashed line circle 9 of FIG. 4 showing that another tine extending through the another one of the openings in the circular support band when the rake wheel is in use to show that the point TCP2 is moved with respect to point ACP2 on the support band because the support band and tine have flexed with respect to each other.

FIGS. 9a and 9b illustrate how the support band allows the tine to move radially relative to the support band: in FIG. 9a Aperture Contact Point 2 (ACP2) and Tine Contact Point 2 (TCP2) are in contact. As the tine slides relative to the support band as shown in FIG. 9b, these two points are separated. Tine Contact Point 2 (TCP2) is shown to have moved generally radially outwardly with respect to Aperture Contact Point 2 (ACP2) from FIGS. 9a to 9b, but Tine Contact Point 2 (TCP2) can also move generally radially inwardly with respect to Aperture Contact Point 2 (ACP2) from the position shown in FIG. 9a during operation of the rake wheel, but while this latter relative position of TCP2 with respect to ACP2 is not shown in the attached drawings it can readily be imagined from looking at FIGS. 9a and 9b while reading this explanation.

Figure 10A:
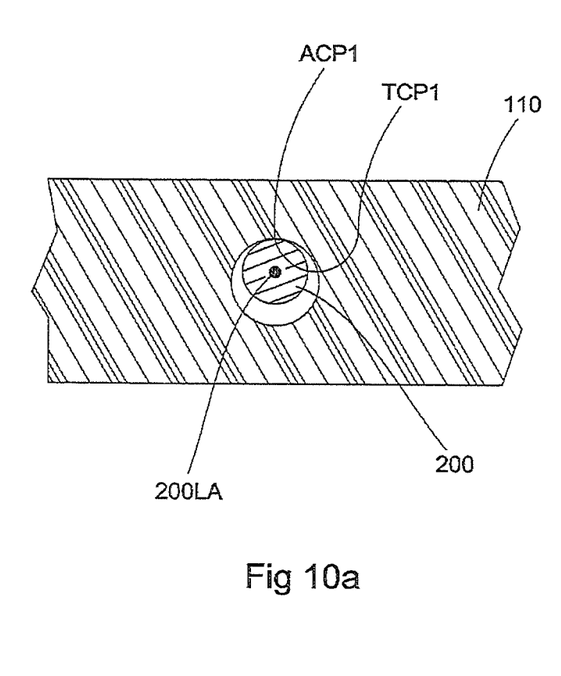
FIG. 10a is a cross sectional view taken along line 10-10 of FIG. 2 showing one of the tines extending through one of the openings in the circular support band when the rake wheel is not in use to show that the point TCP1 is adjacent or touching point ACP1 on the support band.
Figure 10B:
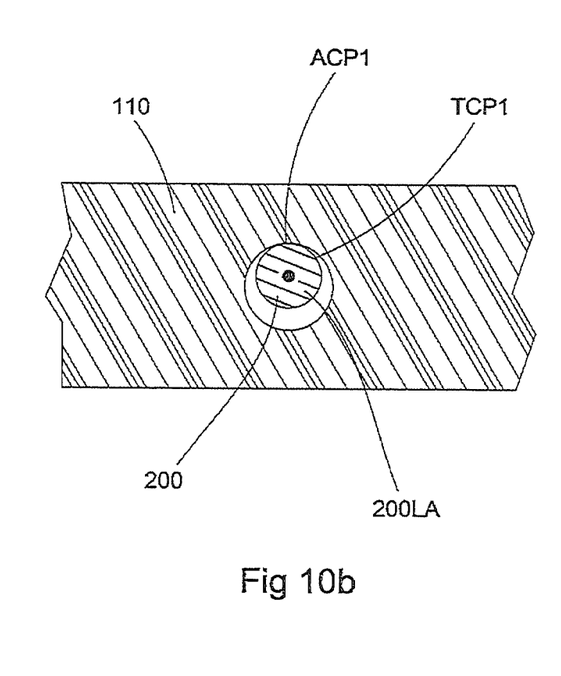
FIG. 10b is a cross sectional view taken along line 10-10 of FIG. 2 showing one of the tines extending through one of the openings in the circular support band when the rake wheel is in use to show that the point TCP1 is rotated with respect to and is no longer adjacent or touching point ACP1 on the support band because the tine has rotated due to flexing when this tine hits the ground and/or encounter some object of resistance such as the hay it is moving.

As described above, the tines are also free to rotate relative to the support band, as illustrated in FIGS. 10a and 10b. In FIG. 10a the tine 200LA is in a slightly loaded condition, where the tine is pushed to one side so that Tine Contact Point 1 (TCP1) contacts Aperture Contact Point 1 (ACP1). As the load on the end of the tine increases, the main body of the tine will twist, and TCP1 will rotate so that it is spaced away from ACP1 as illustrated in FIG. 10b.

In the first embodiment of FIGS. 1 and 2, the present invention utilizes a band 110 made from a material other than steel, to provide lower friction on the tine. The band is preferably made from an ultrahigh molecular weight polyethylene (UHMW PE) or NYLON (PA, Polyamide), an example of this material is marketed by All-State Industries Inc as Extruded Type 6/6. This material is available in bar stock; a preferred embodiment is between 0.25 to 0.50 inch thick and 1.25 to 1.5 inches wide. The bar stock is cut to length, and then rolled into a circular form, with the ends fastened together by a metal clip, to form the cylindrical shape of the band or felly. This band has holes that are pre-drilled, drilled before the bar is rolled into shape. The holes are sized to allow the tine to move freely, to rotate and slide relative to the support band. In the embodiments shown the tine support holes are slightly larger in diameter than the diameter of the tine, but the tine could be in a tight fit within the support holes and still be within the scope of this invention.

The material properties of these preferred materials are significantly different than the low carbon steel that is traditionally used for the support band. The coefficient of friction of the traditional steel tine to steel support band is expected to be approximately 0.3 while the coefficient of friction of the steel tine to the support band constructed from the preferred materials noted above is expected to be approximately 0.1.

In addition to providing a lower coefficient of friction, these preferred materials are also softer than steel, thus they provide a different dynamic characteristic, that affects the noise generated by the wheel assembly during operation, when the individual tines contact the support band.

These two previously mentioned material properties affect the interaction of the individual tines with the support band. Another material property that is significantly different for the preferred materials is the modulus of elasticity: for UHMW it is approximately 120,000 psi, as compared to steel with a modulus of elasticity of 29,000,000 psi. This difference affects the function of the wheel assembly in that the support band made from these preferred materials will be less rigid as a whole. The inventors of the present invention have found that a less rigid band, as made from these preferred materials is adequate.

Since the material properties are related, coefficient of friction with the steel tine is somewhat related to hardness, and to modulus of elasticity, the basis of this first embodiment of the present invention is that the support band can be made from a material other than steel, including materials that are much more flexible, or less rigid. The noted preferred materials are types of plastics that are currently commercially available. Optional materials could provide similar advantages, and if cost competitive, the bands could be made from a variety of materials including metals such as bronze, brass, or aluminum or other non-metallic materials. The basic material properties required for the current invention include the characteristic of providing a lower coefficient of friction with the steel tine, and a surface hardness softer than steel. Patentees of the instant invention have discovered that materials with lower modulus of elasticity provide these characteristics, while the overall rigidity of the support band is still adequate.

This first embodiment of the support band of FIGS. 1 and 2 is described as a plastic material, such as UHMW or NYLON, formed from an elongated bar that is formed into a hoop. However, the support band could be manufactured using alternate processes such as a casting process. A casting process would allow more complex features to be added, as those features would not add significant costs to a cast part. Such features could possibly reduce assembly time or repair time in the field. As illustrated by other embodiments in this document, the support band can be made from multiple pieces that are connected, for commonality of parts, or to make tine installation easier. Another advantage would be the ability to orient the aperture in support band to be parallel with the tine, which would have advantages for the durability of the tines.

Advantages of this first embodiment of FIGS. 1 and 2 include:
1) A support band made from a material that is softer than the metal tine will minimize or eliminate wear of the tine;
2) using a material such as UHMW or NYLON provides a material with better shape memory, and the wheels resist deformation; and wherein
3) this alternate material is lower density than steel, so a wider band can be utilized, to increase the rigidity of the band, while maintaining the same weight.

In the FIGS. 6 and 7 embodiment of the invention the interface between the tine and the support band is improved by the fact that the inserts are manufactured from materials other than steel, such as UHMW or NYLON, which provide most of the same advantages noted above for the first embodiment of FIGS. 1 and 2, wherein the inserts provide a lower coefficient of friction with the steel tine. Since the inserts are supported by a support band made from steel, the modulus of elasticity of the material from which the inserts are made does not affect the rigidity of the wheel. Thus, with this FIGS. 6 and 7 embodiment there are more options for the material used to make the inserts. The material can be selected primarily to optimize friction characteristics and the hardness.

Figure 11:
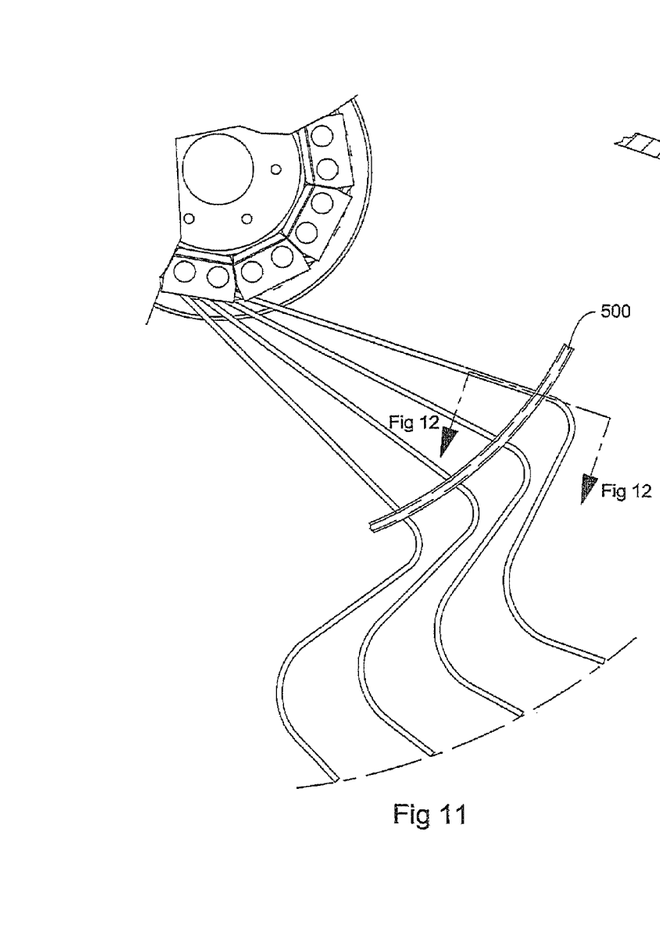
FIG. 11 is an enlarged side elevational view of still another embodiment showing only a segment of the rake wheel with only four of several tines that would be evenly spaced around the periphery of the circular support band, the support band being a composite of steel with plastic at least around the openings where the tines extend through the support band.
Figure 12:
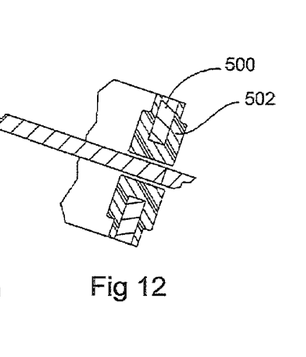
FIG. 12 is an enlarged cross sectional view taken along lines 12-12 of FIG. 11 showing a tine extending through one of the openings in a composite steel/plastic circular support band.

FIGS. 11 and 12 illustrate still another embodiment of the present invention. Similar to the embodiment of FIGS. 6 and 7, this configuration uses a support band 500 manufactured from steel. In this embodiment the apertures are oversized. A material with the appropriate material characteristics, one that is softer than steel, such as UHMW or NYLON, and that relationship results in a lower coefficient of friction with steel, is bonded to the metal ring, illustrated as material 502 in FIG. 12.

In all embodiments, the present invention provides a joint at the interface of the rake tine with the support band that reduces the coefficient of friction, and provides a softer material for supporting the rake tine to also reduce noise.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A rake wheel comprising:
a center hub disposed about a rotational axis;
a circular support band, the circular support band having apertures with inner surfaces made from a first material, the apertures being spaced circumferentially around the circular support band at a fixed position and having a central axis which intersects a circumference of the circular support band;
a plurality of tines made from a second material, the second material having a surface hardness that is greater than a surface hardness of the first material, the tines extending at least generally radially from the center hub to an outer raking diameter, each respective tine being disposed in a respective aperture in the circular support band such that a tine contact point on the outer surface of each respective tine is at least at times touching an aperture contact point on the inner surface of each respective aperture and at other times the tine contact point on the outer surface of each respective tine is not touching the aperture contact point on the inner surface of each respective aperture due to movement of the tine with respect to the circular support band during use of the rake wheel, each tine aperture being larger in diameter than the tine extending there-through to allow each tine to freely move and rotate relative to the circular support band.

2. The rake wheel of claim 1, wherein each respective tine has a longitudinal axis where said tine extends through a respective aperture and displacement of the tine contact point on the outer surface of each respective tine when the tine is touching said aperture contact point on the inner surface of each respective aperture and when the tine is not touching said tine contact point on the outer surface of each respective tine is in a direction that is not parallel to the longitudinal direction due to rotational twisting displacement of the respective tine about the longitudinal axis thereof with respect to the respective outer surface of the respective aperture of the circular support band.

3. The rake wheel of claim 1, wherein each respective tine has a longitudinal axis where said tine extends through a respective aperture and displacement of the tine contact point on the outer surface of each respective tine when the tine is touching said aperture contact point on the inner surface of each respective aperture and when the tine is not touching said tine contact point on the outer surface of each respective tine is in a direction that is parallel to the longitudinal axis due to radial displacement of the respective outer surface of the respective aperture of the circular support band with respect to the respective tine due to flexing of the circular support band with respect to the tines.

4. The rake wheel of claim 1, wherein said touching or not touching of said tine contact point on the outer surface of each respective tine with said aperture contact point on the inner surface of each respective aperture is due to both (a) twisting of respective tines in their respective apertures and (b) flexing of the circular support band with respect to the tines during operation of the rake wheel.

5. The rake wheel of claim 1, wherein the first material of the circular support band is a non-metallic material and the second material of the tine is steel.

6. The rake wheel of claim 1, wherein the second material, when in contact with a third solid material, defines a lower coefficient of friction than the first material when in contact with said third material.

7. The rake wheel of claim 1, wherein the second material has a lower modulus of elasticity than the first material.

8. The rake wheel of claim 1, wherein the first material of the circular support band is at least one of ultrahigh molecular weight polyethylene (UHMW PE) and NYLON (PA, Polyamide) and the second material of the tine is steel.

9. A rake wheel comprising:
a center hub disposed about a rotational axis;
a circular support band made from a non-metallic material, the circular support band having apertures spaced circumferentially around the circular support band at a fixed position and having a central axis which intersects a circumference of the circular support band; said apertures having an inner surface;
a plurality of metal tines extending radially from the center hub to an outer raking diameter, each respective metal tine being disposed in a respective aperture in the circular support band such that an outer surface of each respective tine is at least at times in contact with the inner surface of each respective aperture at a distance corresponding to a radial distance from the rotational axis to the inner surface of the respective aperture, each tine aperture being larger in diameter than the tine extending there-through to allow each tine to freely move and rotate relative to the circular support band; and
wherein the radial distance between the rotational axis and the place of contact of the respective tine with the inner surface of each respective aperture is not a constant distance due to flexing of the support band with respect to the tines during rotation of the rake wheel.

10. The rake wheel of claim 9, wherein each respective tine has a longitudinal axis where said tine extends through a respective aperture and displacement of a place of contact of the tine on the outer surface of each respective tine when the tine is in contact with said aperture on the inner surface of each respective aperture and when the tine is not in contact with the place of contact on the outer surface of each respective tine is in a direction that is not parallel to the longitudinal direction due to rotational twisting displacement of the respective tine about the longitudinal axis thereof with respect to the respective outer surface of the respective aperture of the circular support band.

11. The rake wheel of claim 9, wherein each respective tine has a longitudinal axis where said tine extends through a respective aperture and displacement of a place of contact of the tine on the outer surface of each respective tine when the tine is in contact with said aperture on the inner surface of each respective aperture and the tine is not in contact with the place of contact on the outer surface of each respective tine is in a direction that is parallel to the longitudinal axis due to radial displacement of the respective outer surface of the respective aperture of the circular support band with respect to the respective tine due to flexing of the circular support band with respect to the tines.

12. The rake wheel of claim 9, wherein the at least at times in contact of the outer surface of each respective tine with the inner surface of each respective aperture is due to both (a) twisting of respective tines in their respective apertures and (b) flexing of the circular support band with respect to the tines during operation of the rake wheel.

13. The rake wheel of claim 9, wherein the non-metallic material of the circular support band is ultrahigh molecular weight polyethylene (UHMW PE).

14. The rake wheel of claim 9, wherein the non-metallic material of the circular support band is NYLON (PA, Polyamide).

15. A rake wheel comprising:
a center hub disposed about a rotational axis;
a support band, made from a first material with a thickness between 0.25 and 0.5 inches, having a plurality of apertures with an inner surface between 0.25 and 0.5 inches long, the apertures being spaced circumferentially around the support band at a fixed position and having a central axis which intersects a circumference of the support band; and;
a plurality of tines made from a second material, the second material having a surface hardness that is greater than a surface hardness of the first material, the plurality of tines extending at least generally radially from the center hub to an outer raking diameter, each one of the plurality of tines being disposed in one of the plurality of apertures in the support band such that a tine contact point on its outer surface is at least at times touching an aperture contact point on the inner surface of the aperture, each tine aperture being larger in diameter than the tine extending there-through to allow each tine to freely move and rotate relative to the circular support band.

* * * * *